United States Patent
Mochida et al.

(10) Patent No.: US 9,677,435 B2
(45) Date of Patent: Jun. 13, 2017

(54) OIL PASSAGE STRUCTURE FOR INTERNAL COMBUSTION ENGINE

(71) Applicant: NISSAN MOTOR CO., LTD., Yokohama-shi, Kanagawa (JP)

(72) Inventors: Hiroaki Mochida, Kawasaki (JP); Hideaki Tooyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/438,771

(22) PCT Filed: Oct. 25, 2013

(86) PCT No.: PCT/JP2013/078906
§ 371 (c)(1),
(2) Date: Apr. 27, 2015

(87) PCT Pub. No.: WO2014/069345
PCT Pub. Date: May 8, 2014

(65) Prior Publication Data
US 2015/0267577 A1    Sep. 24, 2015

(30) Foreign Application Priority Data
Oct. 29, 2012  (JP) .................................. 2012-237374
Nov. 14, 2012  (JP) .................................. 2012-249817

(51) Int. Cl.
*F01M 1/12*     (2006.01)
*F02B 67/06*    (2006.01)
(Continued)

(52) U.S. Cl.
CPC .............. *F01M 1/12* (2013.01); *F01M 9/106* (2013.01); *F01M 11/02* (2013.01); *F02B 67/06* (2013.01);
(Continued)

(58) Field of Classification Search
CPC .. F01M 1/06; F01M 9/00; F01M 9/10; F01M 9/108; F01M 11/02; F01M 2011/0021;
(Continued)

(56) References Cited

U.S. PATENT DOCUMENTS

| | | | | |
|---|---|---|---|---|
| 5,090,946 A | * | 2/1992 | Futami | ...................... F16H 7/08 |
| | | | | 474/104 |
| 5,441,457 A | * | 8/1995 | Tsutsumi | .................. F16H 7/08 |
| | | | | 474/110 |
| 6,189,499 B1 | * | 2/2001 | Iwata | ..................... F16F 15/265 |
| | | | | 123/192.2 |
| 6,358,168 B1 | * | 3/2002 | Tada | .......................... F16H 7/08 |
| | | | | 474/101 |
| 6,367,442 B1 | | 4/2002 | Takayanagi | |

(Continued)

FOREIGN PATENT DOCUMENTS

JP   5-171912 A    7/1993
JP   2001-73729 A  3/2001
(Continued)

OTHER PUBLICATIONS

Som, S K. Introduction to Fluid Mechanics and Fluid Mechanics. New Dehli: McGraw, 2008. Google Books. Web. Mar. 29, 2016. (p. 216).*

(Continued)

*Primary Examiner* — Grant Moubry
*Assistant Examiner* — Michael A Kessler
(74) *Attorney, Agent, or Firm* — Foley & Lardner LLP (57) ABSTRACT

Cover (25) is mounted on wall surface (12) on the front side of cylinder block (10). Sub gallery (26) through which engine oil flows is formed between cover (25) and wall surface (12). Chain tensioner (17) is mounted on cover (25), and the engine oil in sub gallery (26) is supplied to chain tensioner (17) through oil supply port (31) formed through cover (25).

12 Claims, 13 Drawing Sheets (51) Int. Cl.
*F01M 9/10* (2006.01)
*F01M 11/00* (2006.01)
*F16H 7/08* (2006.01)
*F01M 11/02* (2006.01)

(52) U.S. Cl.
CPC ............... *F16H 7/08* (2013.01); *F01M 9/108* (2013.01); *F01M 2011/0087* (2013.01); *F01M 2011/021* (2013.01); *F16H 2007/0812* (2013.01); *F16H 2007/0842* (2013.01)

(58) Field of Classification Search
CPC ... F01M 2011/0037; F01M 2011/0066; F01M 2011/0087; F01M 2011/021; F01M 1/08; F01M 1/12; F01M 1/16; F01L 2810/02; F01L 1/022; F01L 1/34; F01L 1/348; F16H 2007/0842; F16H 7/08; F02B 67/06
USPC ...... 123/196 R, 196 W, 195 C, 90.34, 90.38, 123/198 E
See application file for complete search history.

(56) References Cited

U.S. PATENT DOCUMENTS 7,086,915 B2* 8/2006 Hikosaka .............. F02B 61/045
440/88 C

FOREIGN PATENT DOCUMENTS

| JP | 2004-270478 A | 9/2004 | |
|---|---|---|---|
| JP | 2007-2706 A | 1/2007 | |
| JP | 2008-180135 A | 8/2008 | |
| JP | 2008180135 A * | 8/2008 | ............... F01M 1/06 |

OTHER PUBLICATIONS

English machine translation provided by Espacenet for foreign document JP2008180135.*

* cited by examiner

OIL PASSAGE STRUCTURE FOR INTERNAL COMBUSTION ENGINE

TECHNICAL FIELD

The present invention relates to an oil passage structure for an internal combustion engine.

BACKGROUND OF THE INVENTION

Oil galleries are formed in an engine body, such as a cylinder block of an internal combustion engine, in order to supply oil to parts requiring oil supply, such as a hydraulic driving apparatus, in addition to bearing parts and sliding parts requiring lubrication (see Patent Publication 1). Such oil galleries are monolithically formed by casting-out at the time of casting of the cylinder block or by machining such as drilling. In addition, end opening portions, which are not used, opening at front and back wall surfaces of the cylinder block are closed by plugs.

PRIOR ART REFERENCE

Patent Publication

Patent Publication 1: Japanese Patent Application Publication 2004-270478

SUMMARY OF THE INVENTION

Task to be Solved by the Invention

However, as mentioned above, in case of forming the oil galleries by casting-out at the time of casting or by machining, there is a case that the production is difficult due to a limitation of equipment or a high cost equipment investment being required.

In this case, it is effective to mount a cover for oil gallery on a wall surface of the engine body, such as the cylinder block, and form an oil gallery between this cover and the wall surface of the engine body. However, in this way, a place where the cover is mounted is usually the place where chain system parts (chain, chain tensioner, chain guide, etc.) for driving camshafts, etc. are installed in the vicinity of a front end portion of the cylinder block. Therefore, there is a problem that the mounting is difficult due to a severe limitation of layout.

Means for Solving the Task

The present invention has been made in consideration of such a situation. That is, in the present invention, a cover is mounted on a wall surface of the engine body of the internal combustion engine, and an oil gallery through which engine oil flows is formed between this cover and the above-mentioned wall surface of the engine body. The chain system parts, such as a chain tensioner, requiring oil supply are mounted on the above-mentioned cover, and an oil supply port for supplying the above-mentioned engine oil in the above-mentioned oil gallery to the chain system parts is formed in the above-mentioned cover.

Effects of the Invention

According to the present invention, the chain system parts, such as chain tensioner, are mounted on the cover for gallery to form the oil gallery between the cover and the wall surface of the engine body. With this, it is possible to directly supply engine oil to the chain system parts from the oil gallery through the oil supply port of the cover. Therefore, an oil passage structure is simplified, and space efficiency is superior, and flexibility in the layout of the parts is high, as compared with a case that the cover and the chain system parts are mounted separately, thereby substantially improving mountability on vehicles.

MODE FOR IMPLEMENTING THE INVENTION

In the following, the present invention is explained according to the embodiments shown in the drawings. FIG. 1 to FIG. 5 show as a single body cylinder block 10 of the internal combustion engine according to the first embodiment of the present invention. As shown in the same drawings, this cylinder block 10 is used for a V-type six-cylinder internal combustion engine and cast by a metal material such as aluminum alloy or cast iron. Three cylinder bores 11 are arranged in each of right and left banks along the direction of cylinder row (direction of a crankshaft).

Flange portions 13 to mount thereon a front cover (not shown in the drawings) are mounted on a peripheral edge portion of wall surface 12 on the front side of cylinder block 10. A plurality of bolt holes 14 to insert bolts for a cover to fasten and fix the front cover are formed in these flange portions 13. In addition, an automatic transmission and a torque converter are arranged at the back of cylinder block 10.

Figure 9:
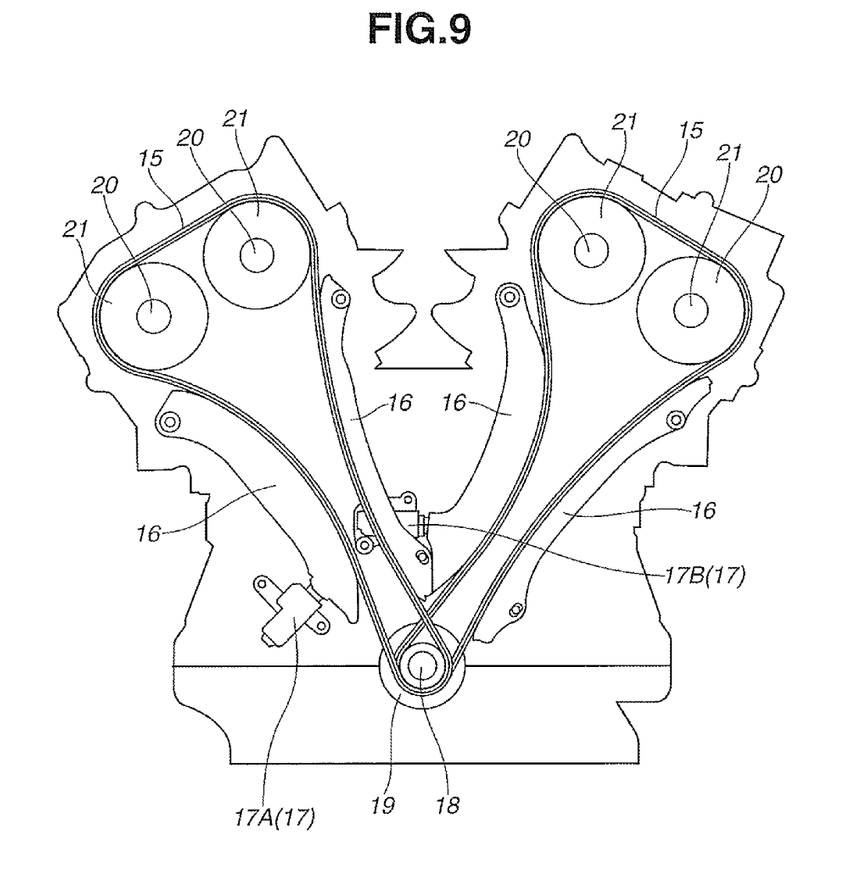
FIG. 9 is a schematic diagram of an example of a power transmission system of a crankshaft-camshaft by a timing chain.

As exemplified in FIG. 9, in addition to timing chains 15, chain guides 16 and chain tensioners 17 etc. are arranged between the front cover and wall surface 12 on the front side of cylinder block 10. As well known, timing chain 15 is wound around crank sprocket 19 attached to the front end of crankshaft 18 and cam sprocket 21 attached to the front end of camshaft 20 to drive intake and exhaust valves. Timing chain 15 transmits the rotation of crankshaft 18 to camshaft 20 at a half speed. In addition, a driving force transmission structure by timing chain 15 is not limited to this. For example, in the first embodiment shown in FIG. 1 to FIG. 8, it is a type in which two camshafts 20 are separately driven by using two timing chains 15, and in which chain tensioners 17A and 17B are respectively provided on timing chains 15.

Referring to FIG. 1 to FIG. 5 and FIG. 7, main gallery 23 as a part of an oil gallery, in which engine oil flows, is formed in this cylinder block 10. This main gallery 23 is monolithically formed at the time of casting cylinder block 10. Main gallery 23 is formed through along the direction of the crankshaft (cylinder row direction), and opening portions 24 and 24A at its both ends (see FIG. 4 etc.) open on wall surface 12 on the front side and wall surface 12 on the back side of cylinder block 10. Opening portion 24A at the rear end of main galley 23 is closed by a plug which is not shown in the drawings.

Figure 4:
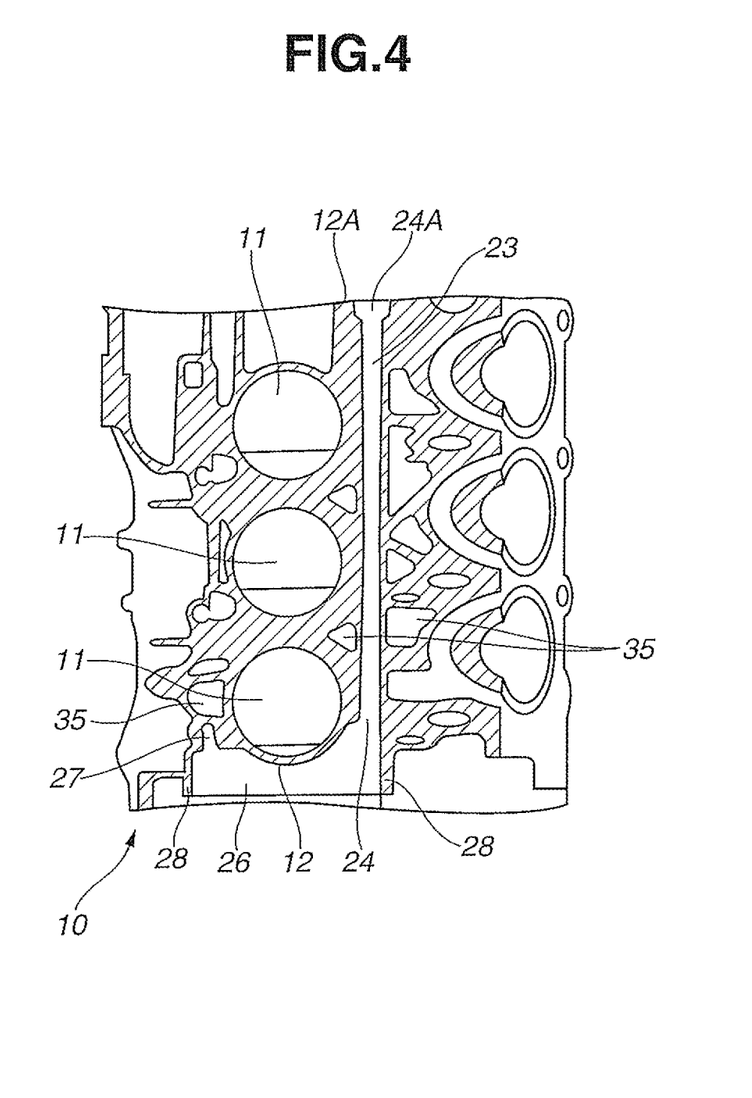
FIG. 4 is a sectional view taken along line A-A of FIG. 2 showing the cylinder block of the above-mentioned embodiment.
Figure 5:
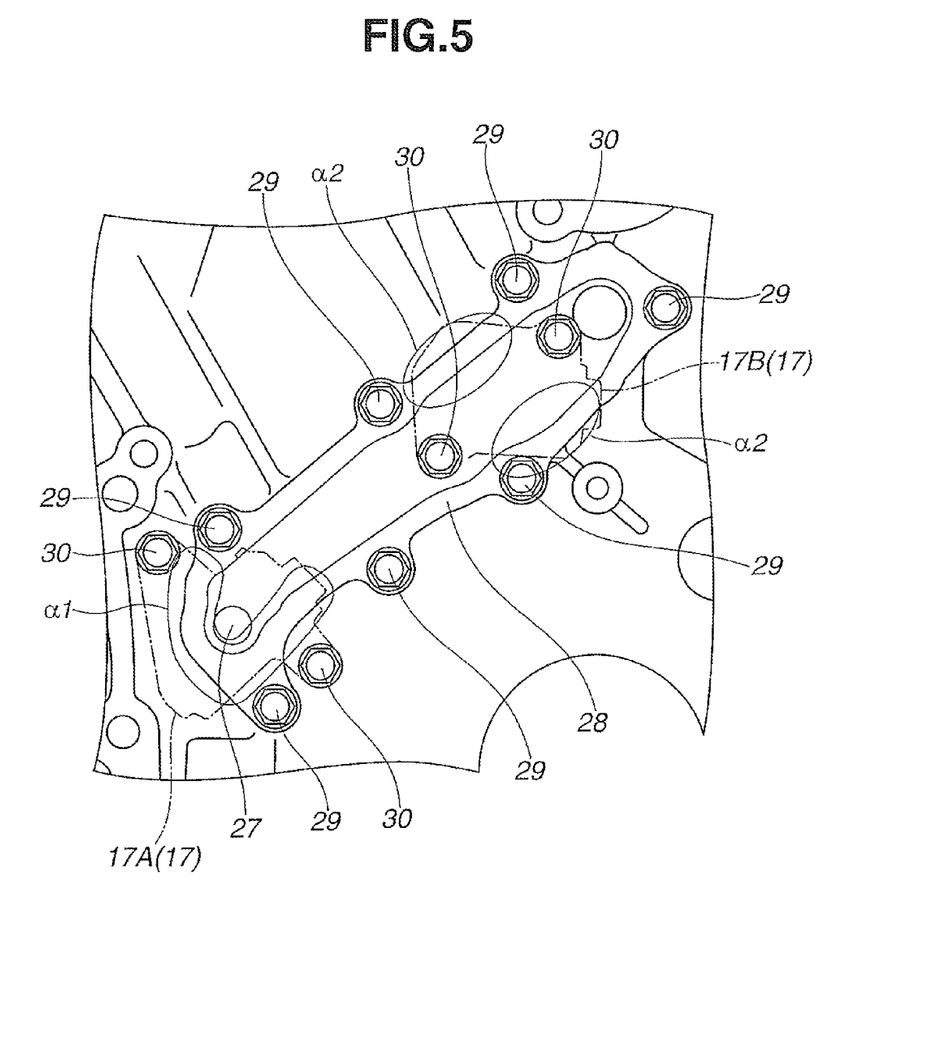
FIG. 5 is a front view showing a main portion of the cylinder block of the above-mentioned embodiment.
Figure 6:
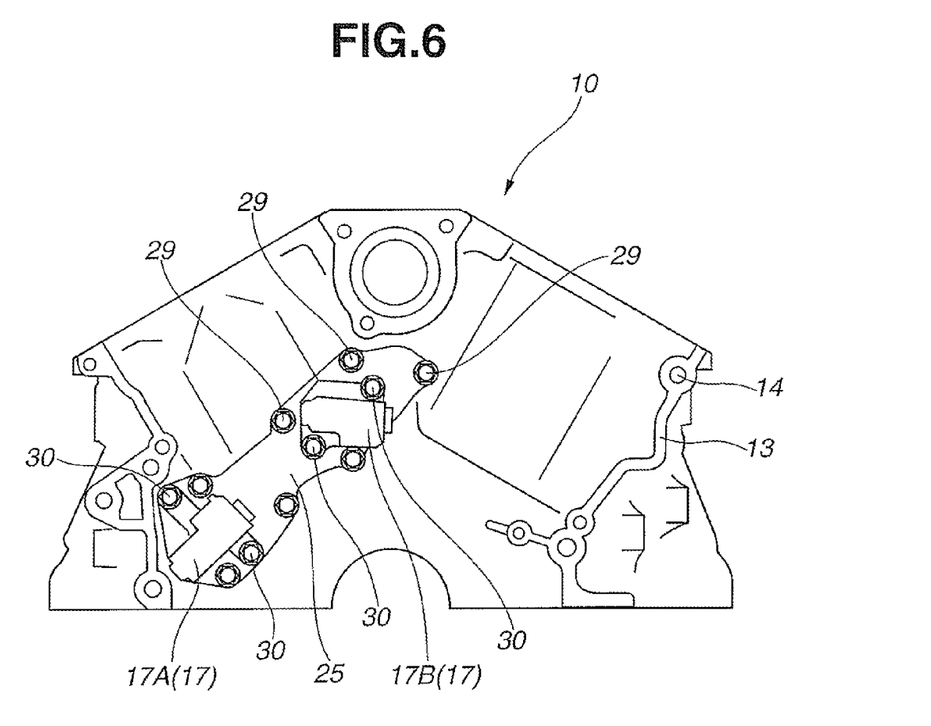
FIG. 6 is a front view showing a condition, in which a cover has been mounted on the cylinder block of the above-mentioned embodiment.
Figure 7:
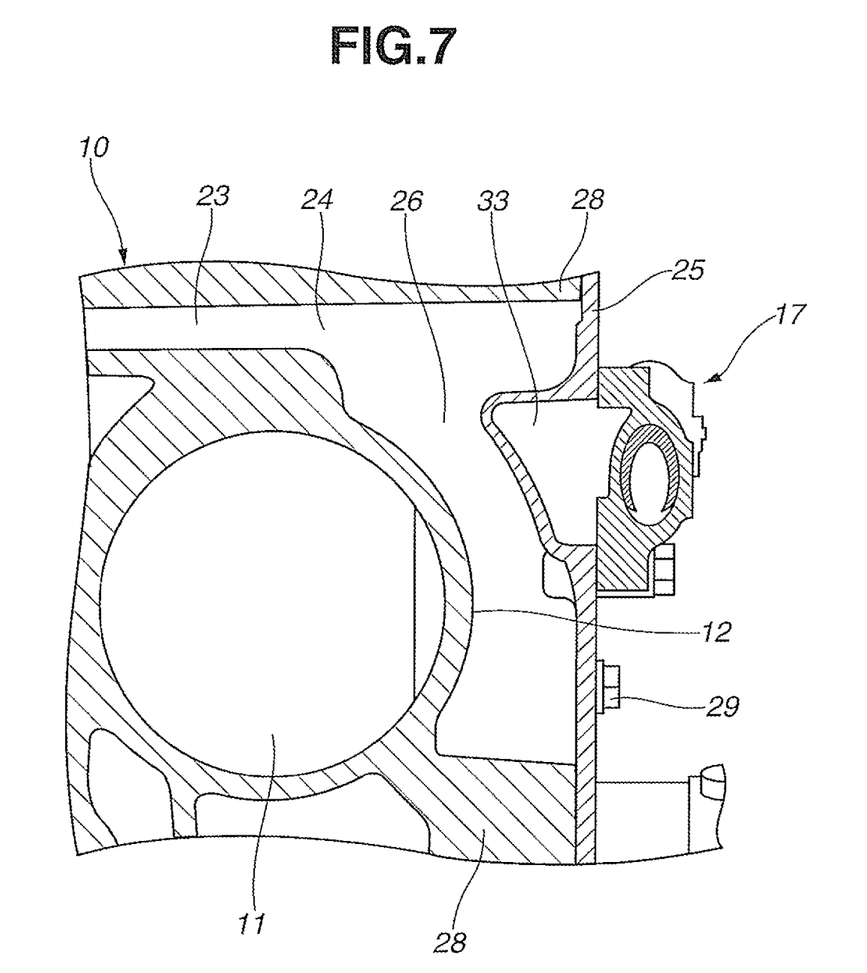
FIG. 7 is a sectional view showing a condition, in which the cover has been mounted on the cylinder block of the above-mentioned embodiment.
Figure 8:
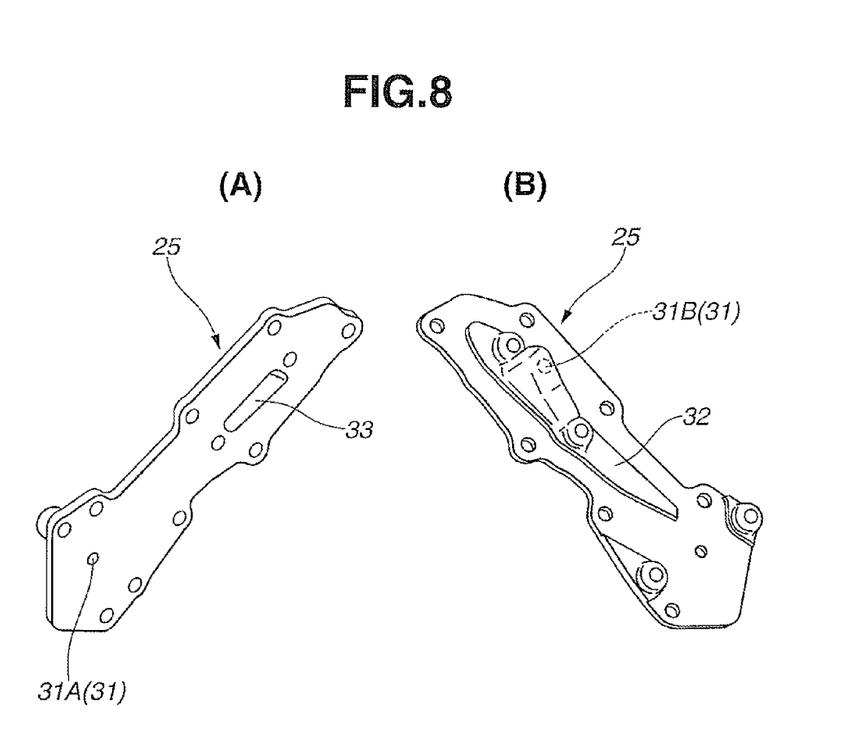
FIG. 8 is a perspective view of a back side (A) and a front side (B) of the above-mentioned cover.

As shown in FIG. 5 to FIG. 7, cover 25 is attached to wall surface 12 on the front side of cylinder block 10 so as to cover opening portion 24 at the front end of main gallery 23. For example, the same as cylinder block 10, this cover 25 is cast by a metal material such as aluminum alloy etc. Sub gallery 26 communicating with main gallery 23 is formed between a back surface of this cover 25 and wall surface 12 on the front side of cylinder brock 10, which is opposed thereto. Engine oil pressured by an oil pump, which is not shown in the drawings, is introduced into sub gallery 26 through oil introducing port 27 opening on wall surface 12 on the front side of cylinder block 10. Then, the engine oil is introduced into main gallery 23 after flowing within sub gallery 26 in the right direction of FIG. 4. In short, sub gallery 26 constitutes an oil introducing passage to introduce oil into main gallery 23.

In addition, rib 28 projecting integrally to the front side along the cylinder row direction is annularly formed on wall surface 12 on the front side of cylinder block 10 in a manner to surround opening portion 24 of main gallery 23. The peripheral edge portion of cover 25 is fixed to a tip end part of this annular rib 28 by using a plurality of bolts 29 (see FIG. 5). Bolt holes 29A are formed in rib 28 to insert the above-mentioned plurality of bolts 29.

As shown in FIG. 5 to FIG. 7, two chain tensioners 17 (17A and 17B) as chain system parts requiring oil are fixed on cover 25 by using bolts 30 for the tensioner (see FIG. 5 and FIG. 6). As well known, each chain tensioner 17 keeps tension of timing chain 15 (see FIG. 9) constant using oil pressure supplied from sub gallery 26. A specific structure of this chain tensioner 17 is publicly known by Japanese Patent Application Publication 2011-2042 etc. Therefore, explanation is omitted.

Oil supply ports 31 (31A, 31B) are formed through cover 25 to supply oil to each chain tensioner 17. Oil is supplied from sub gallery 26 to each chain tensioner 17 through this oil supply port 31. In addition, auxiliary plate 32 is joined to cover 25 to attach one chain tensioner 17B. Reservoir portion 33 which can store and hold oil is provided on this auxiliary plate 32. It is formed to supply oil in sub gallery 26 to chain tensioner 17 via this reservoir portion 33. In addition, auxiliary plate 32 may be monolithically formed on cover 25.

The second to fifth embodiments in FIG. 11 to FIG. 15 show many kinds of layout modification examples of reservoir portion 33. In addition, the same reference signs are placed on the same component elements as those of the above-mentioned embodiments, and overlapped explanations are properly omitted.

Reservoir portion 33 is formed in cover 25 in the above-mentioned first embodiment. However, in the second embodiment shown in FIG. 11, reservoir portion 33A is installed only in chain tensioner 17. Therefore, it is possible to make cover 25 have a simple thin platy shape.

Figure 12:
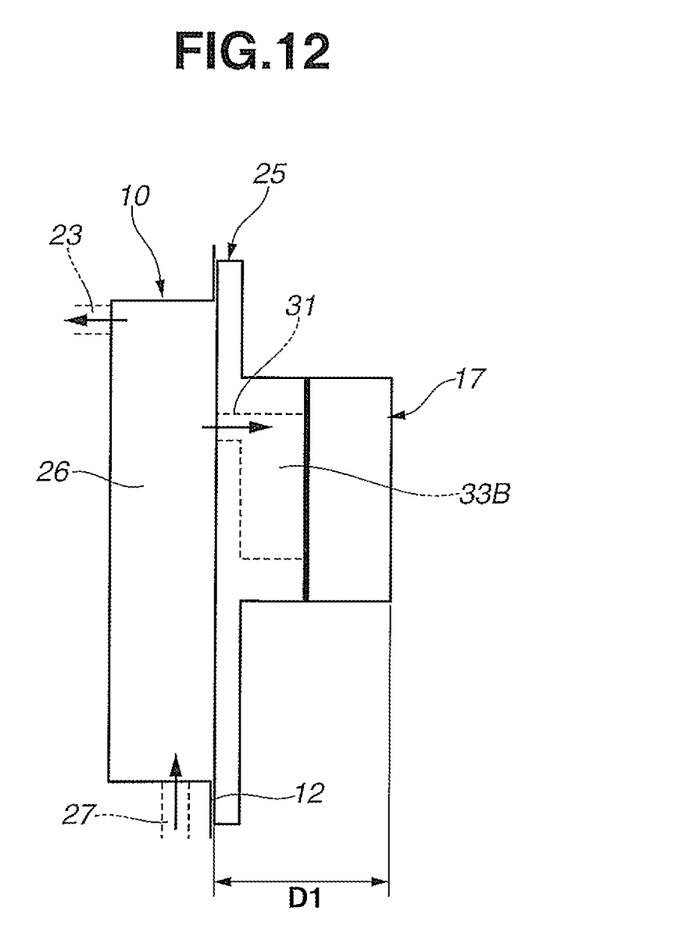
FIG. 12 is a simple schematic diagram of an oil passage structure according to a third embodiment of the present invention.

In the third embodiment shown in FIG. 12, similar to the above-mentioned first embodiment, reservoir portion 33B is formed in cover 25. Reservoir portion 33B of this second embodiment is formed so as to project in a direction (the right direction in FIG. 12) away from sub gallery 26 in the front-back direction of the engine. Therefore, the amount of projection of cover 25 from wall surface 12 of cylinder block 10 becomes large due to providing reservoir portion 33B. Moreover, the amount of projection D1 of chain tensioner 17 from wall surface 12 of cylinder block 10 becomes large as well.

Figure 13:
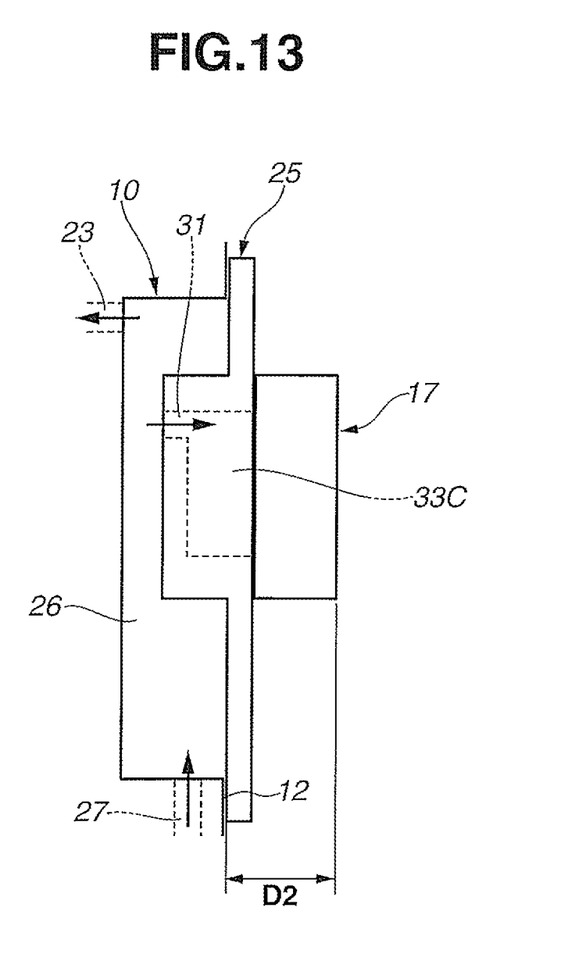
FIG. 13 is a simple schematic diagram of an oil passage structure according to a fourth embodiment of the present invention.

In the fourth embodiment shown in FIG. 13, reservoir portion 33C is formed in cover 25. However, this third embodiment has a structure different from that of the above-mentioned third embodiment in terms of that reservoir portion 33C is formed by recessing a part of this cover 25 to cylinder block 10 so as to enter the part of cover 25 into the inside of sub gallery 26. According to this fourth embodiment, it is possible to suppress the amount of projection of cover 25 from wall surface 12 of cylinder block 10, as compared with the third embodiment, in spite of forming reservoir portion 33C in cover 25. Moreover, it is possible to suppress the amount of projection of D2 (D2<D1) of chain tensioner 17 from wall surface 12 of cylinder block 10, suppress dimension in the front-back direction of the engine, and improve engine mountability.

Figure 14:
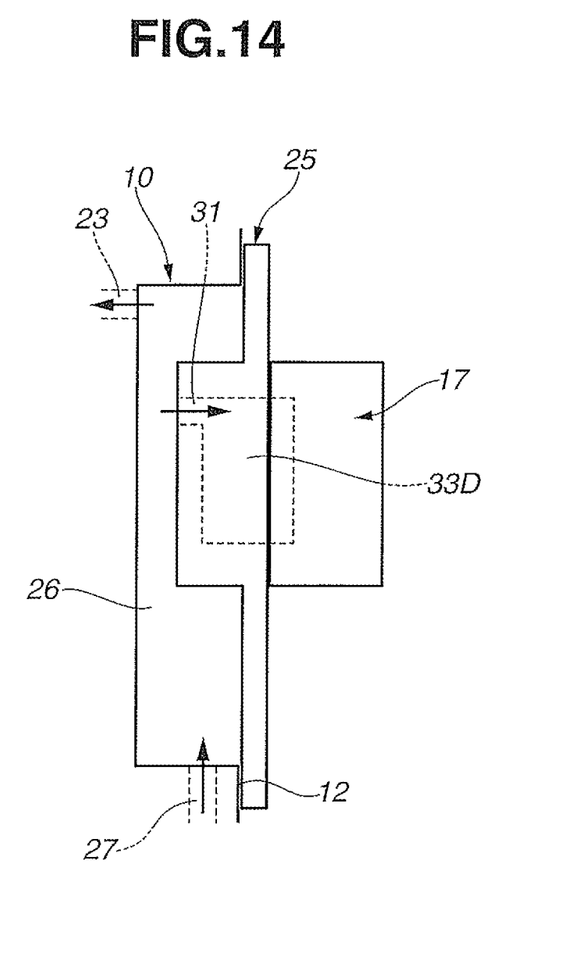
FIG. 14 is a simple schematic diagram of an oil passage structure according to a fifth embodiment of the present invention.

The fifth embodiment shown in FIG. 14 is basically the same as the fourth embodiment. However, reservoir portion 33D is formed to extend from cover 25 into chain tensioner 17. In this case, dimension in the front-back direction of the engine becomes slightly long. However, as a result, it is possible to have a large capacity of reservoir portion 33D.

Figure 15:
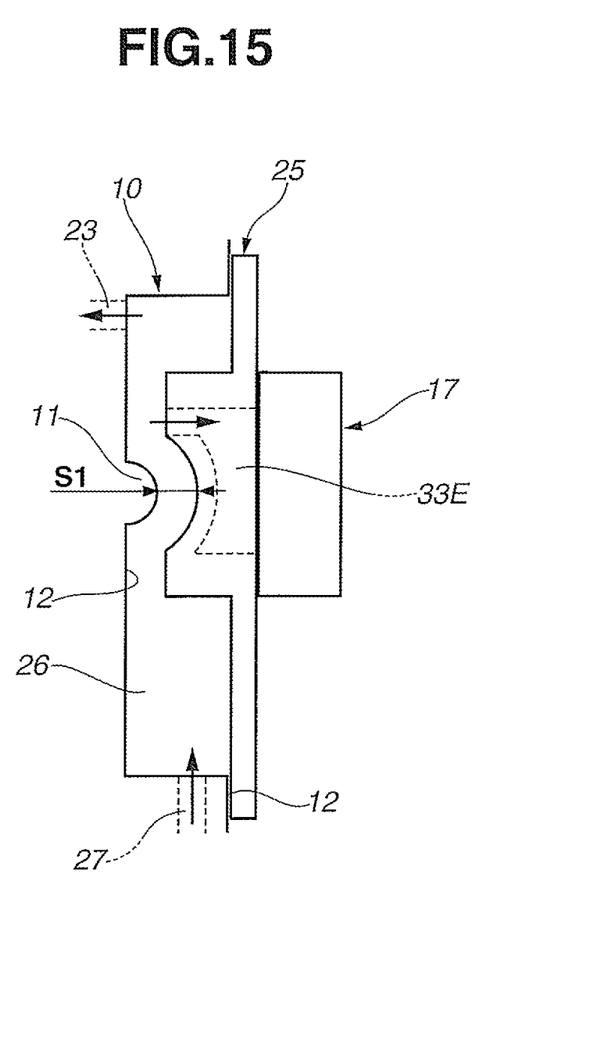
FIG. 15 is a simple schematic diagram of an oil passage structure according to a sixth embodiment of the present invention.

In the sixth embodiment shown in FIG. 15, similar to the above-mentioned first embodiment, the shape of reservoir portion 33E is set to make passage sectional area S1 of sub gallery 26 constant. Specifically, the shape of reservoir portion 33E is formed to match the shape of wall surface 12 of cylinder block 10 opposed to this reservoir portion 33E. More specifically, wall surface 12 of cylinder block 10 opposed to reservoir portion 33E is cylindrically curved along cylinder bore 11 adjacent to this wall surface 12, and a part of cover 25 is cylindrically curved along this cylindrical wall surface 12.

Such characteristic constitution and effects of each embodiment are described below.

[1] As a constitution common to all the first to the sixth embodiments, cover 25 is mounted on wall surface 12 on the front side of cylinder block 10 so as to cover this opening portion 24. Sub gallery 26 as an oil gallery communicating with main gallery 23 is formed between the back side of this cover 25 and wall surface 12 on the front side of cylinder block 10 opposed thereto. Therefore, like the reference example shown in FIG. 10, as compared with a case that a plurality of oil passages 26A (sub galleries) communicating with main gallery 23 are formed in cylinder block 10 by machining, it is possible to reduce the manufacturing cost and the operation workload due to reducing the machining workload. Moreover, a plug for closing opening portion 24 of main gallery 23 becomes unnecessary due to that sub gallery 26 is provided in a manner to communicate with opening portion 24 on the front side of main gallery 23. Therefore, it is possible to reduce the number of parts.

Figure 10:
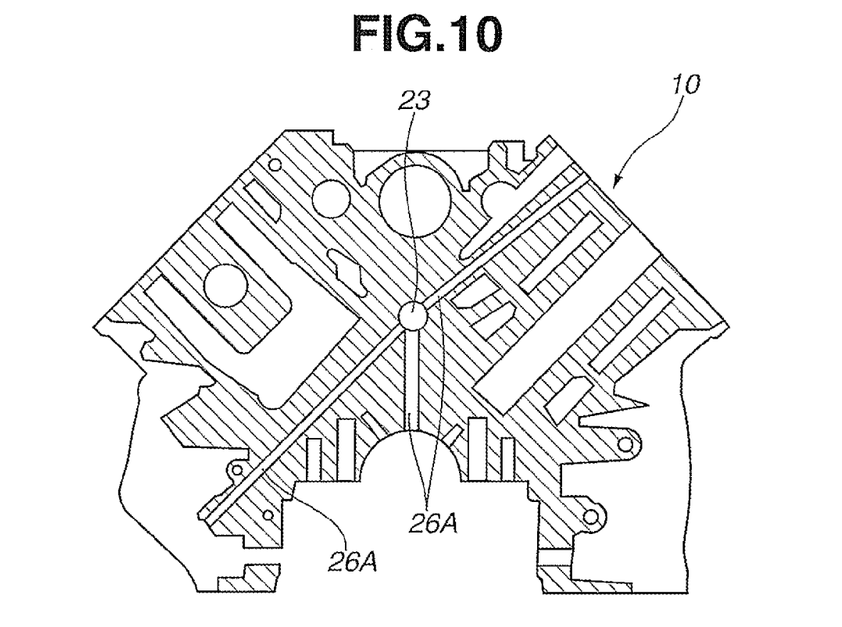
FIG. 10 is a sectional view of a cylinder block in which an oil passage structure according to a reference example has been applied.
Figure 11:
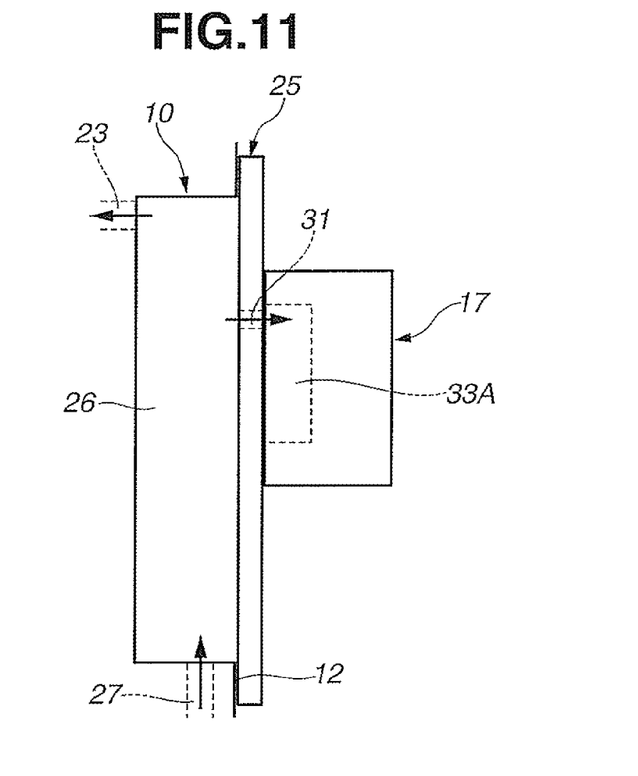
FIG. 11 is a simple schematic diagram of an oil passage structure according to a second embodiment of the present invention.

Like the reference example shown in FIG. 10, in case of forming oil passage 26A communicating with main gallery 23 by drill machining, passage resistance becomes large because the passage area becomes small and a part connecting with main gallery 23 forms a passage structure having a portion sharply bent at a predetermined angle. As compared with such reference example, according to the above-mentioned embodiments, it becomes possible to secure an enough passage area, greatly reduce the passage resistance, and secure an enough flow rate by using a large space formed beside cover 25 as sub gallery 26. Moreover, due to a higher flexibility of the shape compared with a case of forming by drill machining, as mentioned below, it is possible to form a passage structure connecting smoothly to main gallery 23 from sub gallery 26 along the outer shape of cylinder bore 11. Thus, it is possible to substantially reduce the passage resistance as compared with a passage structure having a portion sharply bent as in the reference example.

Especially, like the first embodiment, in case of providing main gallery 23 at the center in the width direction of cylinder block 10, like the reference example shown in FIG. 10, if oil passage 26A connecting to main gallery 23 is formed by drill machining, the machining becomes difficult because oil passage 26A becomes long, a thick portion of the front wall of cylinder block 10 for the machining increases, and it tends to increase the weight and the size of cylinder block 10. Therefore, structures of the present embodiments are extremely useful.

In addition, in the first to the sixth embodiments, it is formed that chain tensioner 17 as a chain system part is mounted on cover 25 to supply oil in sub gallery 26 to chain tensioner 17 through oil supply port 31 formed in cover 25. In this way, it is superior in space efficiency and possible to improve flexibility in layout by mounting chain tensioner 17 on cover 25 for forming sub gallery 26 (oil gallery), as compared with a case that the cover and the chain tensioner are separately mounted. In addition, like the reference example shown in FIG. 10, oil passage 26A is not necessary to be formed separately by drill machining near the wall surface of cylinder block 10. Thus, it is possible to simplify the oil passage structure to supply oil to chain tensioner 17. Therefore, it is possible to substantially improve engine mountability.

[2] As a chain system part to be mounted on cover 25, in the above-mentioned embodiments, there is used chain tensioner 17, which keeps tension of the timing chain constant by oil pressure. However, it is not limited to this as the chain system part. Other chain system parts such as an oil jet to jet oil to a timing chain etc. may be used.

[3] In the first embodiment of FIG. 1 to FIG. 9 and the third to the sixth embodiments of FIG. 12 to FIG. 15, reservoir portions 33 (33C to 33E) to temporarily store and hold oil are provided on the side of cover 25. In this way, it is possible to secure an enough capacity of the reservoir portion by providing reservoir portion 33 on cover 25, as compared with a case that reservoir portion 33B is provided only in the inside of chain tensioner 17 like the second embodiment of FIG. 11. Therefore, it is possible to secure the necessary oil pressure immediately after the engine starts, to suppress vibration of timing chain 15 called damping and sufficiently suppress the generation of noise at the time of the engine start.

[4] In the first embodiment of FIG. 1 to FIG. 9 and in the fourth to the sixth embodiments of FIG. 13 to FIG. 15, reservoir portions 33 (33C to 33E) are formed by depressing a part of this cover 25 toward the engine body side to enter the part of cover 25 into sub gallery 26. Accordingly, as mentioned above, the amount of projection D2 of chain tensioner 17 from wall surface 12 of cylinder block 10 can be suppressed, and dimension of the engine in the front-back direction can be suppressed, in spite of forming reservoir portion 33C on cover 25.

[5] In the first embodiment of FIG. 1 to FIG. 9 and in the sixth embodiment of FIG. 15, the shape of reservoir portion 33 (33E) is set to make passage sectional area S1 of sub gallery 26 constant. That is, wall surface 12 of the engine body opposed to reservoir portion 33 (33E) is cylindrically curved along cylinder bore 11 in the vicinity of wall surface 12 of this engine body, and a part of cover 25 is cylindrically curved along this cylindrical wall surface 12. In this way, it is possible to suppress the passage resistance and obtain an enough flow rate by keeping passage sectional area S1 constant.

[6] As shown in FIG. 5, a thick flange portion 28 provided at the peripheral edge portion of cover 25 is fixed on wall surface 12 of cylinder block 10 as the engine body by a plurality of bolts 29. As shown in symbols α1 and α2 of FIG. 5, parts of the chain tensioners 17A and 17B as chain system parts are arranged to be mounted onto flange portion 28 of cover 25. In short, the parts of the chain tensioners 17A and 17B are overlapped with flange portion 28 of cover 25. With this, it is possible to improve support rigidity of chain tensioner 17. Herein, if the support rigidity is low, chain tensioner 17 tends to be deformed by receiving reaction force from timing chain 15, and there is a fear of becoming a cause of generation of noise by surface vibration of cover 25. However, it is possible to suppress generation of noise by improving support rigidity of chain tensioner 17 in this way.

[7] Chain tensioner 17 as a chain system part is mounted on cover 25, and there is provided a structure to supply oil in sub gallery 26 to chain tensioner 17 through oil supply port 31 formed through cover 25. Therefore, it is unnecessary to separately form oil passage 26A in the vicinity of wall surface of cylinder block 10 by drilling like the reference example shown in FIG. 10 to supply the engine oil to chain tensioner 17. Thus, it is possible to form an extremely simple structure of the passage structure to supply oil to chain tensioner 17.

[8] As shown in FIG. 1 to FIG. 5, there is provided a structure that rib 28 projecting along the direction of the cylinder row is annularly formed on wall surface 12 of the cylinder block, to which one end of main gallery 23 is opened, so as to surround opening portion 24 on the front side of main gallery 23 and that the peripheral edge portion of cover 25 is fixed at the tip end part of this annular rib 28 by bolts 29. Therefore, it is possible to obtain an enough passage area by projectingly forming rib 28 on the wall surface of cylinder block 10. Moreover, it is possible to improve rigidity, which resists deformation of cylinder block 10 in a lateral bending direction and a twisting direction caused by engine vibration by combustion vibration force, by a closed sectional shape formed by this rib 28, cover 25 and wall surface 12 of cylinder block 10. Along with this, it is possible to suppress deformation of cylinder bore 11 caused by fastening head bolts.

Furthermore, this rib 28 is a simple shape which straightly projects in the direction of the cylinder row. Therefore, it is possible to easily and monolithically form rib 28 at the time of casting cylinder block 10 by setting a direction in which a die is removed at the time of casting cylinder block 10, in the direction of the cylinder row.

Figure 1:
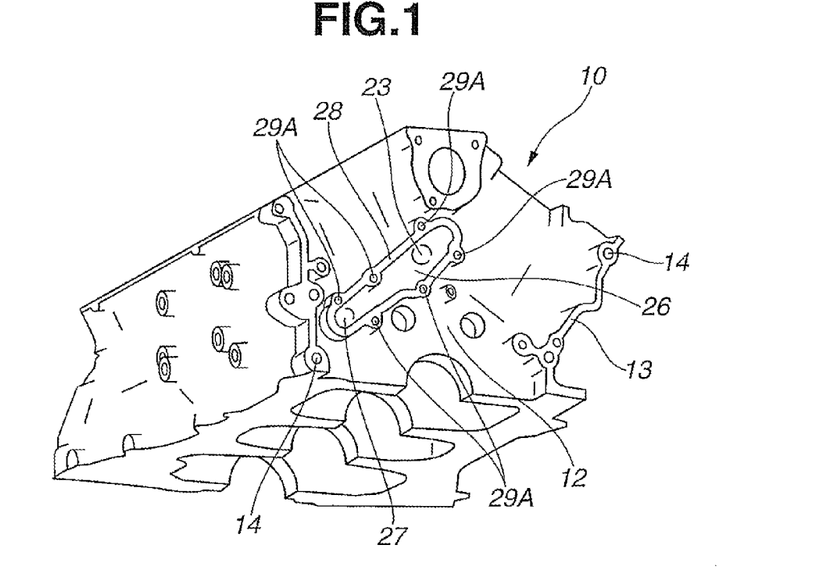
FIG. 1 is a perspective view from a diagonal down side of a cylinder block in which an oil passage structure according to a first embodiment of the present invention has been applied.
Figure 2:
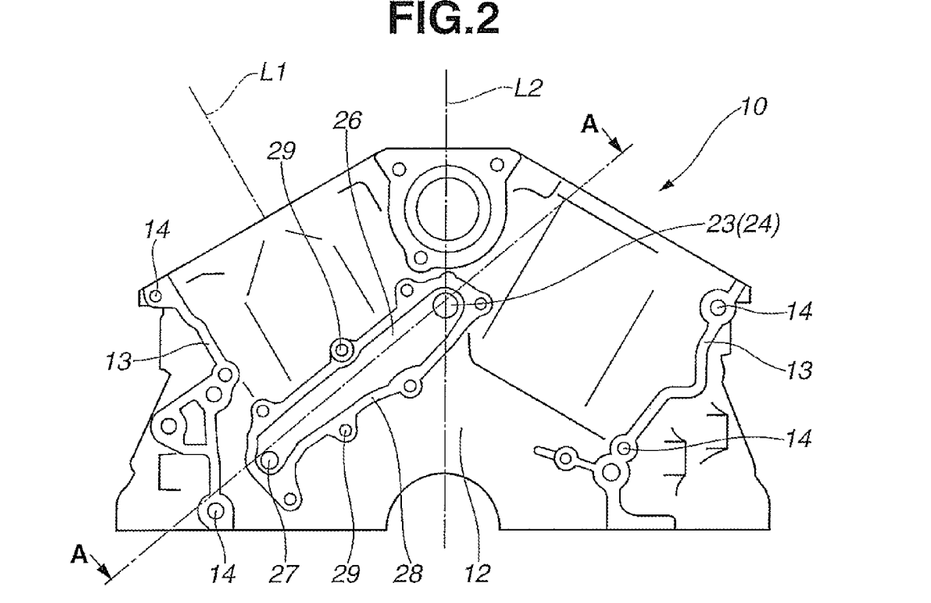
FIG. 2 is a front view of the cylinder block of the above-mentioned embodiment.

[9] As shown in FIG. 2, when viewed in a direction of the crankshaft, rib 28 is widely extended in a width direction of cylinder block 10 (left and right direction of FIG. 2) so as to cross a cylinder row center line L1 of the left side bank in the drawing and also cross a block center line L2 extending in the vertical direction of the engine through a rotation center of crankshaft 18. Therefore, it is especially possible to improve rigidity around cylinder bore 11 in the vicinity of an end surface on the front side of cylinder block 10, on which this rib 28 is provided, by forming rib 28 into a wide ellipse shape extending in the width direction of cylinder block 10, thereby suppressing deformation of cylinder bore 11 caused by fastening the head bolts.

[10] As shown in FIG. 4, wall surface 12 of cylinder block 10 forming a part of an inside surface of sub gallery 26 arcuately curves along the shape of cylinder bore 11 in the vicinity of this wall surface 12 and smoothly connects with main gallery 23. In this way, a series of oil passages from sub gallery 26 to the main gallery is formed by a gently curved shape or a linear shape with no steeply bent portion. Therefore, it is possible to significantly reduce the passage resistance and obtain an enough flow rate.

Moreover, a series of oil passages from sub gallery 26 to main gallery 23 is formed by using the cylindrical shape of wall surface 12 along cylinder bore 11. Therefore, it is superior in space efficiency and possible to reduce the size and the weight.

[11] As shown in FIG. 4, water jackets 35, in which cooling water flows, are formed around cylinder bores 11 of cylinder block 10, and the above-mentioned sub gallery 26 is disposed in the vicinity of water jacket 35. In short, sub gallery 26 is formed along cylindrical wall surface 12 along an outer shape of cylinder bore 11. Therefore, water jacket 35 and sub gallery 26 formed around cylinder bore 11 are necessarily disposed in the vicinity.

In this way, sub gallery 26 is disposed in the vicinity of water jacket 35. With this, heat exchange is actively performed between the cooling water and the oil. Therefore, it is possible to suppress the temperature difference between the oil and the water.

Figure 3:
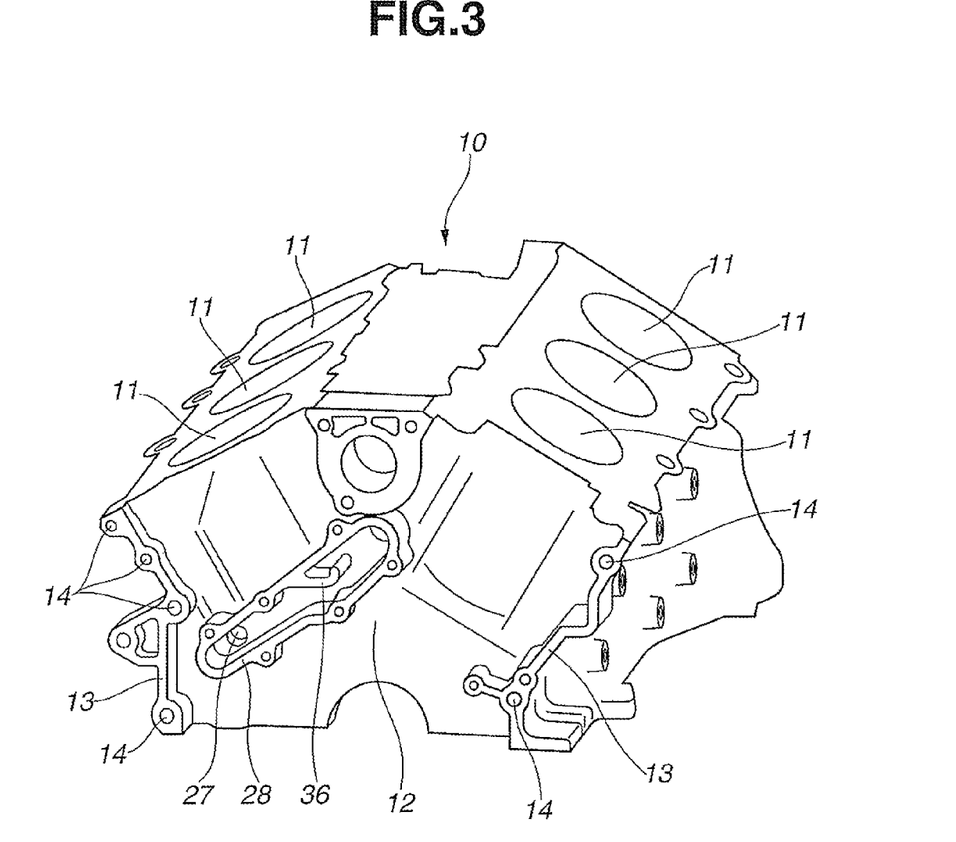
FIG. 3 is a perspective view from a diagonal upper side of the cylinder block of the above-mentioned embodiment.

[12] As shown in FIG. 3, similar to the above-mentioned rib 28, an oil reservoir portion 36 projecting forward from wall surface 12 on the front side is monolithically formed on cylinder block 10. Oil reservoir portion 36 is connected at its one end with rib 28 and is formed into a shallow dish-shape opening upwardly. This oil reservoir portion 36 is disposed to supply oil reserved therein to reservoir portion 33 of chain tensioner 17B through oil supply port 31B.

By providing oil reservoir portion 36 in this way, it becomes possible to reserve oil in oil reservoir portion 36 and reservoir portion 33 after the engine stop, and it is possible to keep oil pressure of chain tensioner 17B immediately after the engine start.

The invention claimed is:

1. An oil passage structure for an internal combustion engine, comprising:
   a cover mounted on a wall surface of an engine body of the internal combustion engine;
   an oil gallery formed for allowing engine oil to flow therein;
   the oil gallery comprising a main gallery and a sub gallery;
   the main gallery being formed in the engine body and comprising an end portion opened on the wall surface of the engine body;
   the sub gallery being formed between the cover and the wall surface of the engine body, the sub gallery connecting an oil introducing port opened on the wall surface of the engine body with the end portion of the main gallery;
   a chain system part mounted on the cover; and
   an oil supply port formed through the cover to supply the engine oil in the sub gallery to the chain system part,
   wherein the cover is provided with a reservoir portion configured to store the engine oil, thereby forming a structure in which the engine oil in the oil gallery is supplied to the chain system part through the reservoir portion,
   wherein the reservoir portion is formed by recessing a part of the cover toward a side of the engine body so as to enter the recessed part of the cover into the oil gallery, and
   wherein the reservoir portion is provided in the recessed part of the cover.

2. The oil passage structure for the internal combustion engine according to claim 1, wherein the chain system part is a chain tensioner to keep tension of a timing chain constant by oil pressure.

3. The oil passage structure for the internal combustion engine according to claim 1, wherein a shape of the reservoir portion is set to make a passage sectional area of the oil gallery constant.

4. The oil passage structure for the internal combustion engine according to claim 1, wherein the wall surface of the engine body opposed to the reservoir portion is cylindrically curved along a cylinder bore adjacent to the wall surface of the engine body.

5. The oil passage structure for the internal combustion engine according to claim 1, wherein a flange portion provided on a peripheral edge portion of the cover is fixed on the wall surface of the engine body by a bolt, and
   wherein a part of the chain system part is mounted on the flange portion of the cover.

6. The oil passage structure for the internal combustion engine according to claim 1,
   wherein the main gallery is formed in a cylinder block of the engine body and extended in a direction in which a plurality of cylinders are arranged, and
   wherein the cover is mounted on the wall surface on a front side or a back side of the cylinder block to which one end of the main gallery is opened,
   wherein the sub gallery is formed between the cover and the wall surface of the cylinder block to communicate with the main gallery, and
   wherein the oil supply port is formed through the cover to supply the engine oil in the sub gallery to the chain system part.

7. The oil passage structure for the internal combustion engine according to claim 6, wherein the sub gallery forms an oil introducing passage to introduce the engine oil into the main gallery.

8. The oil passage structure for the internal combustion engine according to claim 6, wherein a rib projecting along the direction in which the plurality of cylinders are arranged is annularly formed on the wall surface of the cylinder block, to which the one end of the main gallery is opened, so as to surround an opening portion to which the one end of the main gallery is opened, and wherein a peripheral edge portion of the cover is fixed to a tip end part of the rib.

9. The oil passage structure for the internal combustion engine according to claim 8, wherein, when viewed in an extending direction of a crankshaft, the rib is extended in a width direction of the cylinder block to cross a center line of at least one of the plurality of cylinders.

10. The oil passage structure for the internal combustion engine according to claim 6, wherein the wall surface of the cylinder block forming a part of an inner surface of the sub gallery curves along a shape of a cylinder bore adjacent to the wall surface and connects to the main gallery.

11. The oil passage structure for the internal combustion engine according to claim 6, wherein the sub gallery is disposed adjacent to a water jacket formed in the cylinder block.

12. The oil passage structure for the internal combustion engine according to claim 6, wherein the main gallery is disposed at a center part in a width direction of the cylinder block.

\* \* \* \* \*